United States Patent [19]

Strosser

[11] Patent Number: 4,753,463
[45] Date of Patent: Jun. 28, 1988

[54] MISTIE DETECTION AND INDICATION
[75] Inventor: Richard P. Strosser, Akron, Pa.
[73] Assignee: Ford New Holland, Inc., New Holland, Pa.
[21] Appl. No.: 56,191
[22] Filed: Jun. 1, 1987
[51] Int. Cl.⁴ .............................................. B65B 13/26
[52] U.S. Cl. .......................................... 289/2; 100/41; 100/43; 289/13
[58] Field of Search ............... 289/2, 13, 18.1; 100/4, 100/31, 41, 43; 28/211

[56] References Cited
U.S. PATENT DOCUMENTS

| | | | |
|---|---|---|---|
| 3,416,824 | 12/1968 | Nolt et al. | 289/13 X |
| 4,522,120 | 6/1985 | Olfert | 100/43 X |
| 4,624,179 | 11/1986 | Yves et al. | 100/4 |
| 4,624,180 | 11/1986 | Strosser | 100/41 |
| 4,627,341 | 12/1986 | Sudbrack et al. | 100/43 X |

Primary Examiner—Louis K. Rimrodt
Attorney, Agent, or Firm—Griffin, Branigan & Butler

[57] ABSTRACT

A microprocessor-based control circuit monitors mistie switches provided for the knotter mechanism of a rectangular baler. Each knotter has a switch which is actuated a first time when the knotter cycles and a second time if the knotter ties a knot in a loop of twine around a bale. The control circuit controls a visual display to give an operator a first indication if the knotter does not cycle and a second indication if it fails to tie the knot.

2 Claims, 3 Drawing Sheets

MISTIE DETECTION AND INDICATION

RELATED DISCLOSURES

This application relates to the copending application of Robert E. Jackson Ser. No. 056,075 filed 06/01/1987, concurrently herewith, and Strosser U.S. Pat. No. 4,624,180, the disclosures of which are incorporated herein by reference. The Jackson application is assigned to the same assignee as the present application.

BACKGROUND OF THE INVENTION

Strosser U.S. Pat. No. 4,624,180 discloses a microprocessor-based control circuit for controlling a rectangular baler so that bales of crop material of uniform density are produced. It is conventional to provide rectangular balers with knotters, as illustrated in U.S. Pat. No. 3,416,824. After sufficient crop material to form a bale has been compacted, knotters encircle the bale with a loop of twine, tie a knot in the loop, and cut the loop from the twine supply. A knotter station usually has several knotters, the exact number being determined by the size of the bales produced by the baler.

The above-referenced copending application of Jackson discloses a mistie detector for detecting when a knotter fails. However, the mistie detection switch disclosed in that application produces two output signals on each knotter cycle. One signal is produced each time a knotter cycle is initiated and another signal is produced at the time the knot is pulled from the knotter if the knotter properly tied a knot in the loop surrounding the bale.

SUMMARY OF THE INVENTION

An object of the present invention is to provide an apparatus for distinguishing between two signals produced by a single electrical switch so that the output of the switch may be used to separately signal an operator that (1) a knotter has failed to cycle and (2) that a knotter mistied, i.e. failed to properly tie a loop of twine around a bale.

An object of the present invention is to provide a knotter mistie detection system including a microprocessor-based control circuit responsive to mistie detectors for indicating when a knotter fails to tie a knot and when the knotter fails to cycle.

In accordance with the principles of the present invention a plurality of knotter mistie detectors are connected to a microprocessor-based control circuit which monitors the operation of, and controls, the rectangular baler. The microprocessor computes bale movement and if one or more mistie detectors have not been actuated by the time a bale moves a predetermined distance the microprocessor controls a display on an operator's panel to indicate which knotter or knotters failed to tie a knot.

Other objects, features and advantages of the invention will become obvious from the following description and the accompanying drawings.

DESCRIPTION OF A PREFERRED EMBODIMENT

Figure 1:
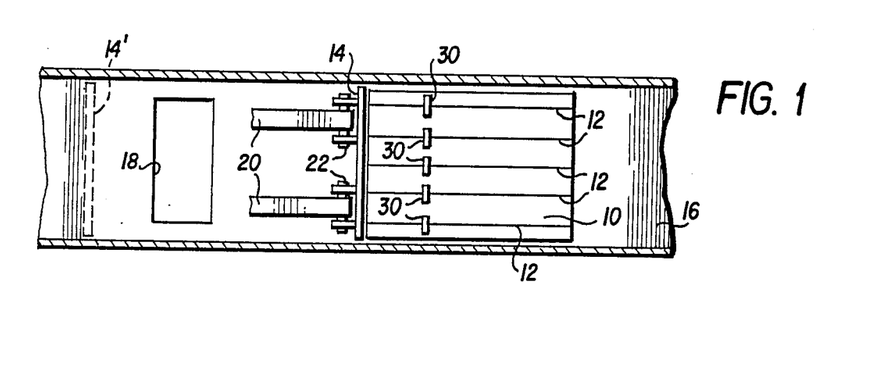
FIG. 1 is a top view, partly in section, of a portion of a rectangular baler.

FIG. 1 is a top view, partly in section, of a rectangular baler for forming bales 10 of compacted crop material and tying the bales with loops of twine 12. The baler includes a plunger 14, a bale casing 16, and opening 18. A crank mechanism (not shown) drives a pair of connecting rods 20 which are pivotally connected to plunger 14 through a pair of bearings 22. As the crank mechanism is operated the plunger 14 is reciprocated between the position shown in solid line which is its limit of travel rearwardly of the baler, and the position 14' which is its limit of travel toward the front of the baler. While the plunger is to the left of opening 18, crop material is injected into the bale casing 16 through the opening. As the plunger moves from 14' to 14 it compacts the crop material against crop material compacted on a previous stroke of the plunger thus building up a bale 10.

As explained in Strosser U.S. Pat. No. 4,624,180, strain gauges 24 may be provided at bearings to sense the force on connecting rods (conrods) 20 and the outputs of the strain gauges may be sampled by a microprocessor-based control circuit 26. The microprocessor then controls movable tension rails (not shown) to vary the cross-sectional area of the bale casing. This permits an operator to control the density of the bales by entering at an operator's panel 28 a value representing a desired density.

When a complete bale has been formed, a knotter station is activated to tie knots in loops of twine 12 and cut the loops from the twine supplies. The knotter station includes a plurality of knotters, each for tying a loop of twine around each bale. Each knotter is provided with a mistie detector pin 30 as disclosed in the above-referenced copending application of Jackson. Each of these pins is pivotally mounted so that it may swing in a horizontal plane. During normal knotter operation the pins 30 are encircled by the loops of twine 12 which encircle bale 10. After bale 10 is tied, and as plunger 14 compresses crop material against bale 10 to form a second bale, the bale 10 is pushed rearwardly of the baler (right in FIG. 1). The pins 30 being within loops of twine 12, are engaged by the loops. At about the time the left-most edge of bale 10 is aligned with the pins, the loops begin pivoting pins 30 until the loops slip over the ends of the pins. The pins 30 are linked to mechanisms which operate mistie switches 32 as the pins are pivoted. Obviously, if a knotter does not tie a knot then there is no loop to engage detector pin 30 for that knotter and the mistie switch associated with the pin is not actuated.

Figure 2:
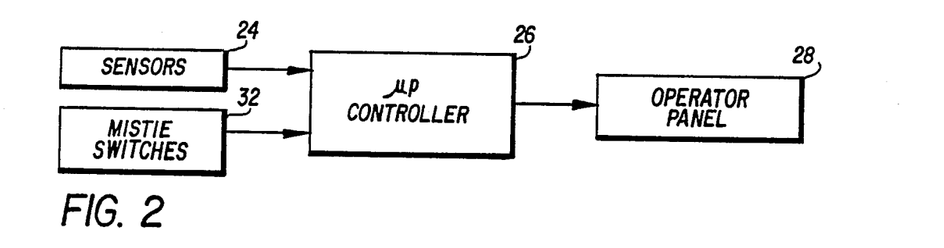
FIG. 2 is a block circuit diagram of a microprocessor-based control system for controlling a rectangular baler.

Although not evident in FIGS. 1 and 2, but as explained in the Jackson application, each mistie switch is normally actuated each time the knotter mechanism is actuated, and is actuated a second time if the knotter associated with the switch fails to tie a knot in the loop 12.

The outputs of the mistie detector switches disclosed in the Jackson application may be applied to a microprocessor-based control circuit such as that disclosed in the Strosser patent in order to control a display on panel 28 and indicate to the operator any malfunction of the knotter station.

Figure 4A:
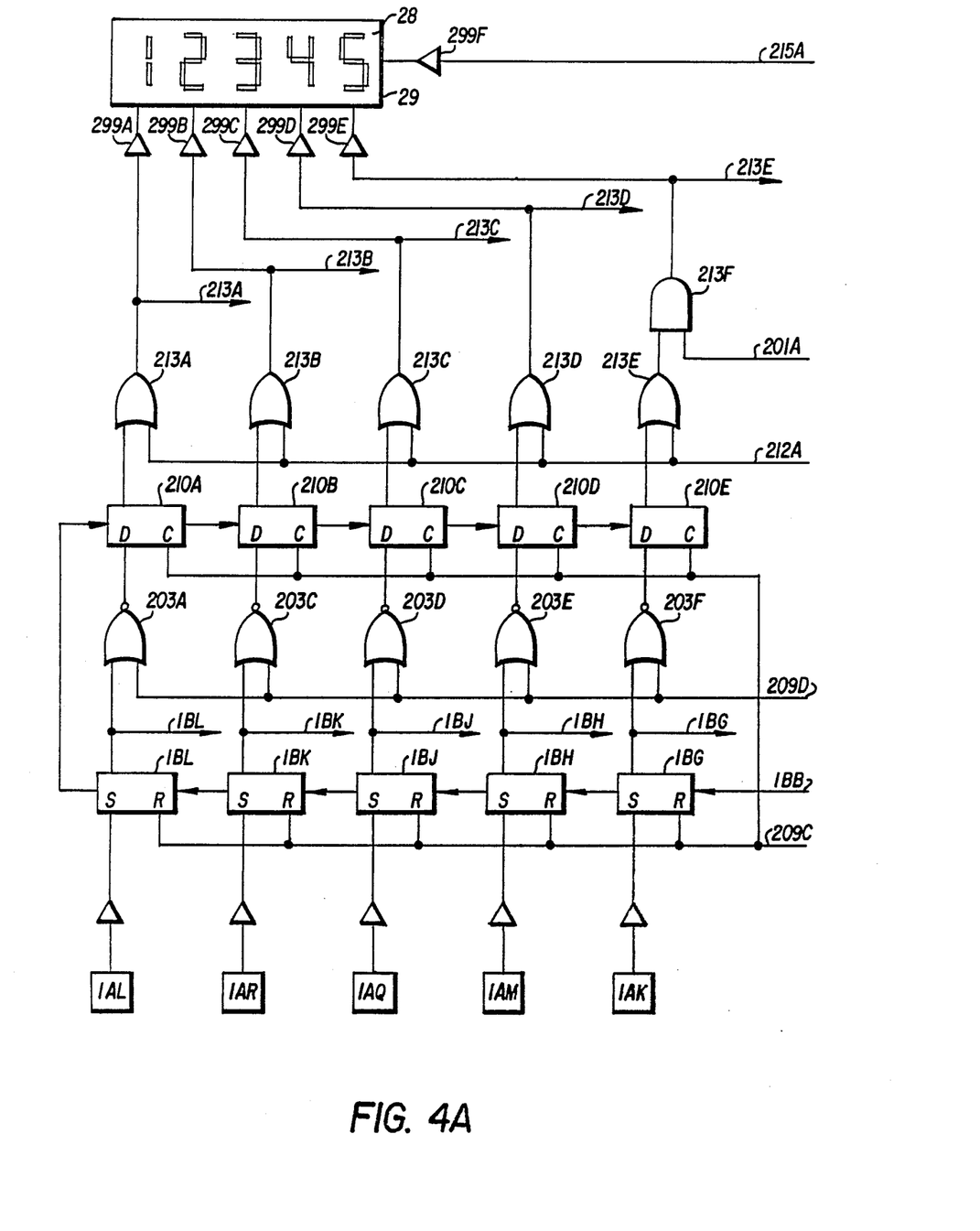

The operator's panel 28 may be like that shown in the patent, and the portion of the panel relating to the present invention is illustrated in FIG. 4A. It includes an LCD display for displaying a lighted border 29 if any mistie occurs, and a plurality of segmented digit displays for identifying by number which mistie switch or switches detected a mistie.

Figure 3:
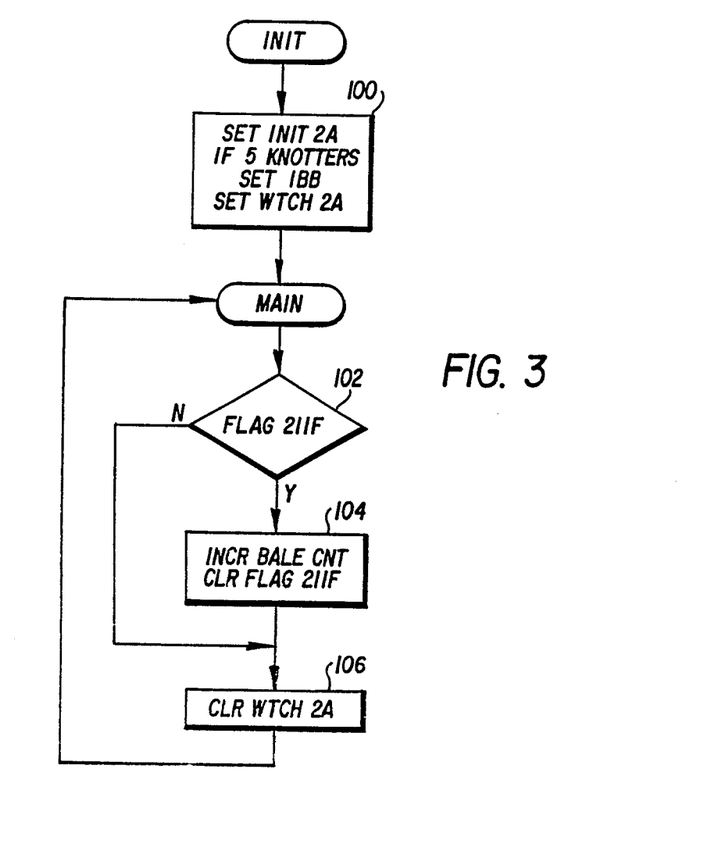
FIG. 3 is a flow diagram illustrating a portion of a microprocessor program; and, FIGS. 4A and 4B comprise a circuit diagram illustrating the hardware emulated by the microprocessor in monitoring and detecting misties.

When the microprocessor in control circuit 26 is turned on it first goes through an Initialize routine for initializing various hardware and setting up initial conditions. As one of the steps, the processor 26, at step 100, checks a stored indication of the baler model number and if the model has 5 knotters a flag INIT2A is set. A Logic Initialize Flag 1BB is cleared and a First Pass Flag (WTCH 2A) is set during the Initialize routine.

After completion of the Initialize routine the program enters a routine MAIN which it repeatedly executes. In accordance with the present invention a Bale Count Update Flag 211F is tested at step 102. If it is set a bale count, i.e. an indication of the number of bales tied, is incremented and flag 211F is cleared at step 104. If flag 211F is not set then the program branches around step 104. The First Pass Flag is cleared at step 106 near the end of the routine.

At intervals of about 500 microseconds the MAIN routine is interrupted and a routine IRQT is executed during which the conrod load sensors 24 are sampled and analyzed. If a peak of conrod loading is detected a routine LOOP is called. This routine performs several functions including computation of bale slip for the plunger stroke just completed. The microcade listing for the portions of the LOOP routine related to the present invention appears in Appendix A to this specification.

Figure 4B:
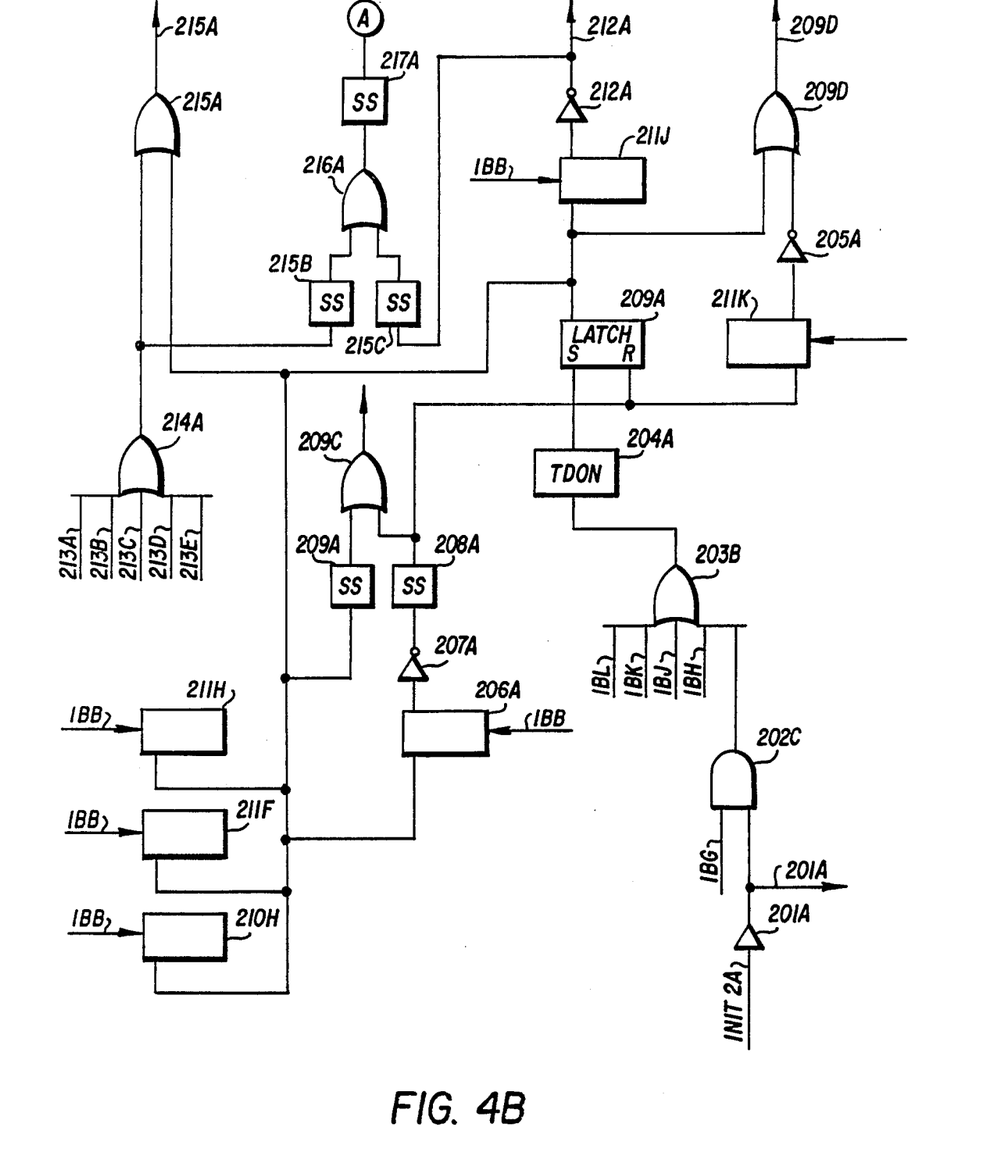

The IRQT also calls a routine SCAN which samples various inputs such as the mistie switches and generates codes for updating the operator's panel. The SCAN routine jumps to a LOGIC routine where the microprocessor analyzes the inputs and from the analysis sets flags to control the program and the operator's panel. The macrocode for generating the flags necessary for controlling the mistie detection and indication function is set forth in Appendix A. FIGS. 4A and 4B illustrate the hardware equivalent of the analysis performed by the LOGIC routine.

As shown in FIG. 4A, a mistie switch 1AL is connected to the set input of a S/R register 1BL. The output of IBL is connected to one input of a NOR 203A and one input of an OR 203B (FIG. 4B). The output of NOR 203A is applied to the data input of a CD latch 210A. The output of latch 210A is applied through an OR 213A to a register 299A and an OR 214A (FIG. 4B). When the register 299A is set it is sensed during the SCAN routine and that routine causes the numeral 1 to appear on the operator's panel 28 indicating that knotter 1 failed to tie a knot. The output of OR 213A acts through OR 214A (FIG. 4B) and OR 215A to set register 299F. The output of this register is sensed during the SCAN routine to control the lighting of the border 29 on panel 28.

The arrangement for the other mistie switches is the same as that for switch 1AL except that the circuit for the fifth mistie switch 1AK includes an AND 213F connected between OR 213E and register 299E, and a second AND 202C connected between register 1BG and OR 203B. The flag IN1T 2A is registered at 201A and the output of this register is applied to both ANDs 202C and 201A. As previously indicated, IN1T 2A is set if the baler has five knotters. If the flag is not set, ANDs 202C and 213F are blocked, thereby isolating the circuit for the fifth mistie switch.

In FIG. 4B, are several flag latches which are set or reset by the 1BB flag which is set at step 100 of FIG. 3. Flag latches 206A, 210H, 211F and 211K are reset to 0 while flag latches 211H and 211J are set to 1.

In a normal cycle the mistie switches all produce output signals to set latches 1BL-1BG (FIG. 4A). The outputs of the latches pass through OR 203B and trigger a 0.75 sec. time delay on (TDON) 204A. The output of TDON 204A sets S/R latch 209A. The output of latch 209A passes through OR 215A to register 299F which is the flag for turning on the mistie border 29 when the display is updated.

The output of latch 209A sets latches 206A, 210H, 211F, 211H and 211J. The flag latch 206A causes a down counter to be preset at LOOP 40 (see appendix) with the current mistie detection distance. The flag is cleared when LOOP 40 determines that the bale has traveled the mistie detection distance.

Flag latch 210H is sensed at LOOP 23 and causes the strokes/bale count and the slip/bale count to be updated. The slip/bale count is used in an adaptive control algorithm to derive the mistie detection distance, i.e. how far the bale must travel before the logic checks for a mistie. It is also used in another adaptive control algorithm to derive the knotter failure distance, i.e. how far the bale must travel before the logic declares a knotter failure.

Flag latch 211F is sensed by the routine MAIN (FIG. 3) to increment Bale Count, the number of bales tied. The routine clears 211F after the count is updated.

Flag latch 211H causes the knotter failure distance to be present in LOOP 44 after which the flag latch is cleared.

Flag latch 211J will not result in any changes provided a prior knotter failure has not occurred.

When latch 209A is set it acts through OR 209D and NORs 203A-203F to apply logic 0 to latches 210A-210E thus preventing the setting of flags 299A-299E. This in turn prevents any of the mistie numerals from being displayed when the panel is updated.

When latch 209A is set it pulses single shot 209B which provides a one-cycle delay. The output of the single shot acts through OR 209C to reset latches 210A-210E and 1BL-1BG.

On the next mistie sensing cycle the mistie switches again set latches 1BL-1BG. A mistie results in the corresponding latch remaining reset.

Flag latch 206A is cleared at LOOP 40 after the bale has traveled a distance equal to the mistie detection distance. Flag latch 206A then clears flag 209A and sets flag latch 211K through NOT 207A and single shot 208A. Both inputs to OR 209D are low so one input of each of NORs 203A-203F is low. The other inputs of NORs 203A-203F reflect the mistie conditions as stored in 1BL-1BG. If there was a mistie the corresponding latch 1BL-1BG remains reset so the corresponding NOR 203A-203F applies a logic 1 to the corresponding latch 210A-210E. The mistie is clocked into the latch by the output of latch 206A acting through NOT 207A, single shot 208A and OR 209C. Mistie latches 1BL-1BG are cleared at the same time the mistie indications are clocked into latches 210A-210E. If any of the mistie latches 210A-210E is/are set, the outputs of the set latches act through the ORs 213A-213E to set the registers 299A-299E. This causes the numerals in display 28 corresponding to the failed knotter or knotters to be displayed when the display is updated. The border 29 is also displayed because a circuit extends from each of ORs 213A-213E to OR 214A (FIG. 4B), and from OR 214A through OR 215A to the register 299F which controls the display border 29.

An audible alarm is sounded for 3 seconds in case of a mistie. The output of OR 214A is applied through single shot 215B, OR 216A and 3second single shot 217A to the audible alarm A.

In the case where a knotter fails to cycle the audible alarm is sounded for three seconds and all of the numerals on the display are lit to indicate misties by all knotters. The bale length is constantly monitored and if the bale exceeds the knotter failure detection distance flag latch 211J is cleared in the LOOP routine. The output of latch 211J acts through NOT 212A, single shot 215C, OR 216A and single shot 217A to sound the alarm. The output of NOT 212A also acts through all of NORs 213A-213E to set all of registers 299A-299E. This causes all of the mistie numerals 1-5 to be lighted when the display is updated.

While a preferred embodiment of the invention has been described in specific detail it will be obvious that various substitutions and modifications can be made in the described embodiment without departing from the spirit and scope of the invention as defined by the appended claims.

```
*
        LESRO    1BB,209C,    1BL  *
        LESRO    1BB,209C,1BK    *
        LESRO    1BB,209C,1BJ    *
        LESRO    1BB,209C,1BH    *
        LESRO    1BB,209C,1BG    *
*
        AND2     1BG,201A,202C   *
*
        OR5      1BL,1BK,1BJ,1BH,202C,203B
*
        TDON     (750)/50,1BB,203B,204A
*
        NOT      211K,205A       *
*
        FL       1BB,209A,206A   *
*
        NOT      206A,207A       *
*
        SS1      207A,208A       *
*
        LSRO     1BB,204A,208A,209A
        SS1      209A,209B       *
        OR2      209B,208A,209C  *
        OR2      205A,209A,209D  *
*
        NOR2     1BL,209D,203A   *
        NOR2     1BK,209D,203C   *
        NOR2     1BJ,209D,203D   *
        NOR2     1BH,209D,203E   *
        NOR2     1BG,209D,203F   *
*
        LD       1BB,209C,203A,210A
        LD       1BB,209C,203C,210B
        LD       1BB,209C,203D,210C
        LD       1BB,209C,203E,210D
        LD       1BB,209C,203F,210E
*       FL       1BB,209A,210F
        FL       1BB,209A,210H   *
        FL       1BB,209A,211F   *
*
        ENDIF                    *
*
        FL1      1BB,209A,211H   *
        FL1      1BB,209A,211J   *
        LR1      1BB,208A,211K   *
```

```
*
        NOT     211J,212A         *
*
        OR2     210A,212A,213A *
        OR2     210B,212A,213B *
        OR2     210C,212A,213C *
        OR2     210D,212A,213D *
        OR2     210E,212A,213E *
        AND2    201A,213E,213F *
*
        OR5     213A,213B,213C,213D,213F,214A
*
        OR2     209A,214A,215A *
        SS1     214A,215B         *
        SS1     212A,215C         *
*
        OR2     215B,215C,216A *
*
        SST     (3000)/50,1BB,216A,217A
*
        EQ      213A,299A         "DISP: MISTIE #1"
        EQ      213B,299B         "DISP: MISTIE #2"
        EQ      213C,299C         "DISP: MISTIE #3"
        EQ      213D,299D         "DISP: MISTIE #4"
        EQ      213F,299E         "DISP: MISTIE #5"
        EQ      215A,299F         "DISP: MISTIE: BORDER"
        PROG                      *
        RTS                       *

CODE FROM MODULE LOOP:

*
*       UPDATE STROKES PER BALE COUNT AND INTEGRATED SLIP
*
        TBA                       SLIP TO ACCA
        ADD A   LOOP34A           ADD SLIP TO INTEGRATED VALUE LSB
        STA A   LOOP34A           STORE IT
        LDA A   LOOP34B           GET INTEGRATED SLIP MSB
        ADC A   #0                ADD CARRY
        STA A   LOOP34B           STORE IT
        INC     LOOP32A           INCREMENT STROKES/BALE COUNT TEMP
        BNE     LOOP23            *
        COM     LOOP32A           *
**
**      CHECK FOR KNOTTER CYCLE
**
        EXTEND                    *
LOOP23  LDA A   L210H             CHECK KNOTTER CYCLE FLAG
        DIRECT                    *
        BMI     LOOP24            BRANCH IF KNOTTER CYCLED
        JMP     LOOP40            *
**
**      CHECK FOR 1ST PASS
**
        EXTEND                    *
LOOP24  LDA A   WTCH2A            *
        DIRECT                    *
        EXT     WTCH2A            *
        BMI     LOOP25            *
```

```
                LDA A    LOOP32A          GET STROKES/BALE COUNT TEMP
                STA A    LOOP33A          STORE: STROKES/BALE COUNT
                LDA A    LOOP34A          GET INTEGRATED VALUE LSB
                STA A    LOOP35A          STORE IT
                LDA A    LOOP34B          GET INTEGRATED VALUE MSB
                STA A    LOOP35B          STORE IT
        LOOP25  CLR A                     CLEAR TEMPS
                EXTEND                    *
                STA A    L210H            CLEAR KNOTTER CYCLE FLAG
                DIRECT                    *
                STA A    LOOP32A          CLEAR STROKES/BALE COUNT TEMP
                STA A    LOOP34A          CLEAR INTEGRATED VALUE LSB
                STA A    LOOP34B          CLEAR INTEGRATED VALUE MSB
        *
        *       CHECK 1ST PASS FLAG
        *
                EXTEND                    *
                LDA A    WTCH2A           *
                DIRECT                    *
                BPL      LOOP26           *
                JMP      LOOP39           *
        *
        *       UPDATE ADAPTIVE BALE SLIP COUNT
        *
        **
        **      CALCULATE MISTIE DIST. AND BALE OVERTRAVEL DIST.
        **
        ***
        ***     GET SLIP/BALE
        ***
        LOOP26  LDA B    LOOP35B          *
                STA B    CHECK2           *
                LDA A    LOOP35A          *
                STA A    CHECK2           *
        ***
        ***     DIVIDE BY 8
        ***
                LSR B                     *
                ROR A                     *
                LSR B                     *
                ROR A                     *
                LSR B                     *
                ROR A                     *
        ***
        ***     CHECK FOR MAX VALUE
        ***
                CMP B    #0               *
                BEQ      LOOP27           *
                LDA A    #125             *
        ***
        ***     CHECK MODEL NUMBER: D1000 / 2000
        ***
        LOOP27  TST      INIT2A           *
                BPL      LOOP30           BRANCH IF MODEL D1000
        ***
        ***     CHECK FOR MINIMUM: 2000
        ***
                CMP A    #80              *
                BCC      LOOP28           *
                LDA A    #80              SET MINIMUM
                BRA      LOOP29           *
```

```
***
***     CHECK FOR MAXIMUM: 2000
***
LOOP28  CMP A   #125            *
        BCS     LOOP29          *
        LDA A   #125            *
***
***     UPDATE ADAPTIVE ACCM BALE OVERTRAVEL SET POINT
***
LOOP29  STA A   SCAN26M         *
        STA A   CHECK2          *
***
***     UPDATE ADAPTIVE MISTIE SET POINT
***
        STA A   SCAN26K         *
        STA A   CHECK2          *
**
**      CALCULATE KNOTER FAILURE DISTANCE
**
***
***     GET SLIP/BALE
***
LOOP30  LDA B   LOOP35B         *
        LDA A   LOOP35A         *
***
***     MULTIPLY BY 1.5
***
****
****    DIVIDE BY 2
****
        LSR B                   *
        ROR A                   *
****
****    ADD 1x
****
        ADD A   LOOP35A         *
        ADC B   LOOP35B         *
***
***     CHECK MODEL NUMBER: D1000 / 2000
***
        TST     INIT2A          *
        BMI     LOOP34          BRANCH IF MODEL 2000
***
***     CHECK FOR MINIMUM: D1000
***
        CMP B   #002H+1         *
        BCC     LOOP32          *
        CMP B   #002            *
        BNE     LOOP31          *
        CMP A   #058H           *
        BCC     LOOP32          *
LOOP31  LDA B   #002H           *
        LDA A   #058H           *
        BRA     LOOP38          *
***
***     CHECK FOR MAXIMUM: D1000
***
LOOP32  CMP B   #003H           *
        BCS     LOOP38          *
        BNE     LOOP33          *
```

```
              CMP  A    #0E8H+1          *
              BCC       LOOP38           *
     LOOP33   LDA  B    #003H            *
              LDA  A    #0E8H            *
              BRA       LOOP38           *
***
***      CHECK FOR MINIMUM: 2000
***
     LOOP34   CMP  B    #003H+1          *
              BCC       LOOP36           *
              CMP  B    #003             *
              BNE       LOOP35           *
              CMP  A    #0E8H            *
              BCC       LOOP36           *
     LOOP35   LDA  B    #003H            *
              LDA  A    #0E8H            *
              BRA       LOOP38           *
***
***      CHECK FOR MAXIMUM: 2000
***
     LOOP36   CMP  B    #007H            *
              BCS       LOOP38           *
              BNE       LOOP37           *
              CMP  A    #0D0H+1          *
              BCC       LOOP38           *
     LOOP37   LDA  B    #007H            *
              LDA  A    #0D0H            *
***
***      UPDATE ADAPTIVE KNOTTER FAILURE DISTANCE
***
     LOOP38   STA  B    SCAN26H          *
              STA  B    CHECK2           *
              STA  A    SCAN26G          *
              STA  A    CHECK2           *
**
**       END...ADAPTIVE VARIABLE UPDATES
**
*
*        CLEAR 1ST PASS FLAG
*
     LOOP39   CLR       WTCH2A           *
*
*        UPDATE TIE CYCLE INFORMATION
*
              EXTEND                     *
     LOOP40   LDA  A    L206A            CHECK: "FLAG: TIE CYCLE START"
              DIRECT                     *
              BPL       LOOP41           BRANCH IF FLAG NOT SET
              LDA  A    LOOP7A           GET: "BUFFER: MISS-TIE SLIP COUNT"
              SBA                        SUBTRACT SLIP READING
              STA  A    LOOP7A           SAVE: "BUFFER: MISS-TIE SLIP COUNT"
              BCC       LOOP42           BRANCH IF INTEGRATION NOT COMPLETE
              EXTEND                     *
              CLR       L206A              "FLAG: LRB: TIE CYCLE COMPLETE"
              DIRECT                     *
     LOOP41   LDA  A    SCAN26K          GET MISS-TIE SLIP COUNT
              PSH  B                     SAVE SLIP
     *        JSR       MLTT
     *        TST  B
     *        BEQ       LOOPJ1
     *        LDA  A    #0FFH            SET AT MAX
```

```
*OOPJ1   STA A    LOOP36A           DATA ACQ.
         STA A    LOOP7A            "BUFFER: MISS-TIE SLIP COUNT"
         PUL B                      GET SLIP
*
*        CHECK FOR BALE OVER TRAVEL ON FULL-HOUSE CONDITION
*
         EXTEND                     *
LOOP42   LDA A    L106AB            CHECK: "FLAG: FULL HOUSE"
         DIRECT                     *
         BPL      LOOP43            BRANCH IF FLAG NOT SET
         LDA A    LOOP11A           *
         SBA                        *
         STA A    LOOP11A           *
*        LDA A    LOOP11B
*        SBC A    #0
*        STA A    LOOP11B
*        LDX      LOOP11B
*        BPL      LOOPF
         BCC      LOOP44            *
         EXTEND                     *
         CLR      L106AB            CLEAR: "FLAG: FULL HOUSE"
         DIRECT                     *
*OOPG    LDX      #SCAN26M          GET MISS-TIE SLIP COUNT
LOOP43   LDA A    SCAN26M           *
         PSH B                      SAVE SLIP
*        JSR      MLTT
*        STA B    LOOP11B
         STA A    LOOP11A           "BUFFER: MISS-TIE SLIP COUNT"
         PUL B                      GET SLIP
*
*        CHECK FOR KNOTTER FAILURE
*
         EXTEND                     *
LOOP44   LDA A    L211H             CHECK "FLAG: KNOTTER CYCLE"
         DIRECT                     *
         BPL      LOOP45            *
         PSH B                      *
         LDX      SCAN26H           *
*        JSR      MLTT
*        STA A    LOOP8A
*        STA B    LOOP8B
         STX      LOOP8B            *
         PUL B                      *
         CLR      L211H             *
LOOP45   LDA A    LOOP8A            *
         SBA                        *
         STA A    LOOP8A            *
         LDA A    LOOP8B            *
         SBC A    #0                *
         STA A    LOOP8B            *
         LDX      LOOP8B            *
         BPL      LOOP46            *
```

The embodiments of the invention in which an exclusive property or privilege is claimed are defined as follows:

1. A knotter mistie detection apparatus for a baler having a knotter station with a plurality of knotters, said mistie detection apparatus comprising:

a sensor switch for each knotter, said sensor switch producing a first signal when a knotter cycles and a second signal only if the associated knotter failed to tie a knot;

an operator panel; and, a control circuit responsive to said sensor switches for displaying on said panel a first indication when any knotter fails to cycle and a second indication if one of said knotters fails to tie a knot in a loop.

2. A mistie detection apparatus as claimed in claim 1 wherein said control circuit includes means for determining movement of a bale and displaying said first indication when the movement of said bale is greater than a predetermined knotter failure detection distance.

* * * * *